United States Patent [19]

Ogawa et al.

[11] Patent Number: 4,504,115
[45] Date of Patent: Mar. 12, 1985

[54] DIGITAL FACSIMILE COMMUNICATION SYSTEM CAPABLE OF REPRESENTING TONE DIFFERENCES

[75] Inventors: Mutsuo Ogawa, Yokohama; Noboru Murayama, Tokyo, both of Japan

[73] Assignee: Ricoh Company, Ltd., Japan

[21] Appl. No.: 341,256

[22] Filed: Jan. 21, 1982

[30] Foreign Application Priority Data

Jan. 23, 1981 [JP] Japan ................................. 56-9375

[51] Int. Cl.$^3$ ............................................. H04N 1/00
[52] U.S. Cl. .................................. 358/260; 358/283; 358/261
[58] Field of Search ............... 358/260, 261, 262, 282, 358/283, 280, 298

[56] References Cited

U.S. PATENT DOCUMENTS

| | | | |
|---|---|---|---|
| 4,212,035 | 7/1980 | Nakagome et al. | 358/261 |
| 4,215,375 | 7/1980 | Usubuchz et al. | 358/261 |
| 4,237,495 | 12/1980 | Yamamoto | 358/282 |
| 4,258,393 | 3/1981 | Ejiri et al. | 358/280 |
| 4,340,912 | 7/1982 | Troxel | 358/283 |
| 4,414,581 | 11/1983 | Kato et al. | 358/280 |
| 4,420,771 | 12/1983 | Pirsch | 358/133 |
| 4,447,829 | 5/1984 | Schayes et al. | 358/280 |
| 4,447,831 | 5/1984 | Adsett | 358/280 |

Primary Examiner—John C. Martin
Assistant Examiner—Edward L. Coles
Attorney, Agent, or Firm—Guy W. Shoup

[57] ABSTRACT

A digital communication system capable of representing tone differences is provided. In the present system, the threshold level used as a reference in converting an analog image signal into a binary image signal is varied, preferably, from scanning line to scanning line at the transmitter side. Then, at the receiver side, exchanging or rearranging of the binary image data between different scanning lines in the same address is carried out. By so doing, data compression technique may be advantageously applied at all times to maintain a high transmission rate.

8 Claims, 4 Drawing Figures

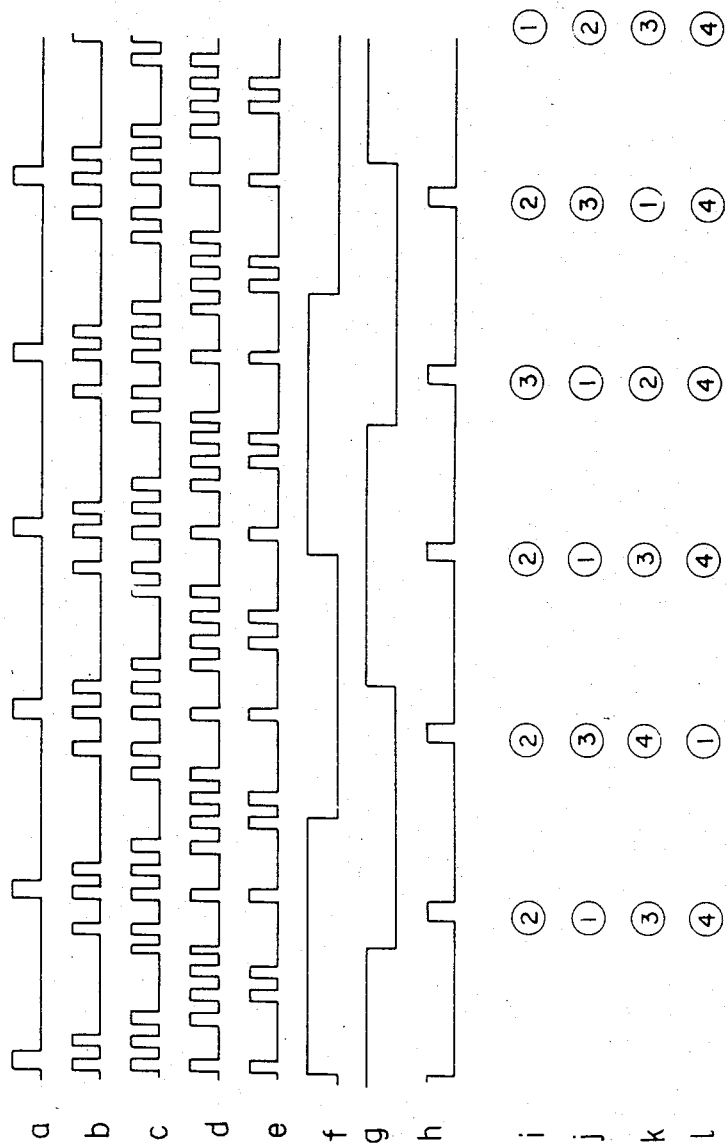

DIGITAL FACSIMILE COMMUNICATION SYSTEM CAPABLE OF REPRESENTING TONE DIFFERENCES

BACKGROUND OF THE INVENTION

1. Field of the Invention

This invention generally relates to a digital facsimile communication system for transmitting and receiving a binary image signal and in particular to a digital facsimile communication system which can represent tone differences in a reproduced copy.

2. Description of the Prior Art

The digital facsimile is widely used primarily because of its faster transmission rate over the analog facsimile. Although the digital facsimile has many advantages, it cannot be directly applied for an original having tone variations such as a photographic picture. Because, the digital facsimile is structured to work on a binary image signal consisting of only two possible states "high" and "low", a tone difference cannot be represented without special signal processing technique.

The currently most promising prior art technique for representing tone differences in the digital facsimile communication is the so-called dither technique. In accordance with this technique, the threshold level to be used as a reference in converting an analog image signal into a binary image signal is varied at random or regularly for a single or a predetermined number of picture elements when scanning along the main scanning direction, i.e., along the lengthwise direction of a single array image sensor, and at the same time the threshold level is similarly varied at random or regularly with respect to the auxiliary scanning direction which is perpendicular to the main scanning direction. The dither-processed image signal is excellent in image reproducibility; however, it tends to decrease the rate of transmission.

In a digital facsimile system, the run length of either the "white" or "black" picture elements along the scanning line in the main scanning direction is converted into an appropriate code, usually according to the modified Huffman coding, in order to carry out data compression, thereby eliminating redundancy in the information to be transmitted. However, if the binary image signal is dither-processed, the transition from "white" to "black" or its reverse would multiply and the transmission rate would be significantly lowered in certain cases. Thus, it is often the case with the prior art digital facsimile to bypass its data compressor to transmit the binary image signal without carrying out data compression. In this connection, the CCITT standards as to facsimile communication also set down the non-compression mode as well as the compression mode as a possible mode of digital facsimile transmission. It should however be noted that the use of the noncompression mode of transmission is not advantageous because, in the case of transmitting the information contained on a single DIN A4-sized document, several mega-bits of picture elements on the average must be transmitted and it would take about several hundred seconds if such information is transmitted at the rate of 4,800 bps.

SUMMARY OF THE INVENTION

The disadvantages of the prior art are overcome with the present invention and an improved digital facsimile communication system capable of representing tone differences is provided. In accordance with the present invention, there is provided a digital facsimile communication system capable of representing tone differences comprising a transmitter, a receiver and a transmission line for connecting said transmitter with said receiver, said transmitter comprising:

analog-to-digital data converting means for converting analog image data obtained by photoelectrically scanning an original into binary image data with the use of a multilevel threshold, the level of which is varied for every predetermined number of said binary image data forming a group; and data compressing means for compressing said binary image data in order to eliminate redundancy of information; and said receiver comprising:

data decompressing means for decompressing said compressed binary image data transmitted through said transmission line; and scrambling means for scrambling the binary image data at least between two of said groups thereby forming an output signal.

Preferably, use may be made of a telephone line as the transmission line, and, in such circumstances, the transmitter and the receiver each comprises a MODEM in order to convert the binary image data into audio signals suitable for transmission over the telephone line and vice versa. The analog-to-digital data converter preferably includes a threshold voltage generator which produces different threshold levels at random or in a cyclic manner. Preferably, the threshold voltage generator maintains a threshold level at constant during scanning along the main scanning line which corresponds to the lengthwise direction of a single array image sensor.

The scrambling means preferably includes a buffer for temporarily storing a predetermined number of groups of binary image data supplied from the data decompressing means and an exchanger for exchanging the binary image data in the same address among said predetermined number of groups. The exchanger may exchange the data at random or in a cyclic manner. It is to be noted that the exchanger may include a computer for controlling the manner of exchanging data.

It is therefore an object of the present invention to provide an improved digital facsimile communication system capable of representing tone differences.

Another object of the present invention is to provide a digital facsimile communication system which is capable of providing the dither effect without lowering the data transmission rate.

A further object of the present invention is to provide a digital facsimile communication system capable of representing tone differences which allows the application of data compression technique at all times without incurring disadvantages.

A still further object of the present invention is to provide a fast digital facsimile communication system which is rather simple in structure and therefore easy to manufacture.

Other objects, advantages and novel features of the present invention will become apparent from the following detailed description of the invention when considered in conjunction with the accompanying drawings.

BRIEF DESCRIPTION OF THE DRAWINGS

FIG. 2b is a logic circuit showing the detailed structure of randomizer 24 shown in FIG. 2a; and FIG. 2c is a timing chart showing the relationship between the pulse signals to be used in connection with the randomizer shown in FIG. 2b and its several outputs.

DESCRIPTION OF THE PREFERRED EMBODIMENTS

Figure 1:
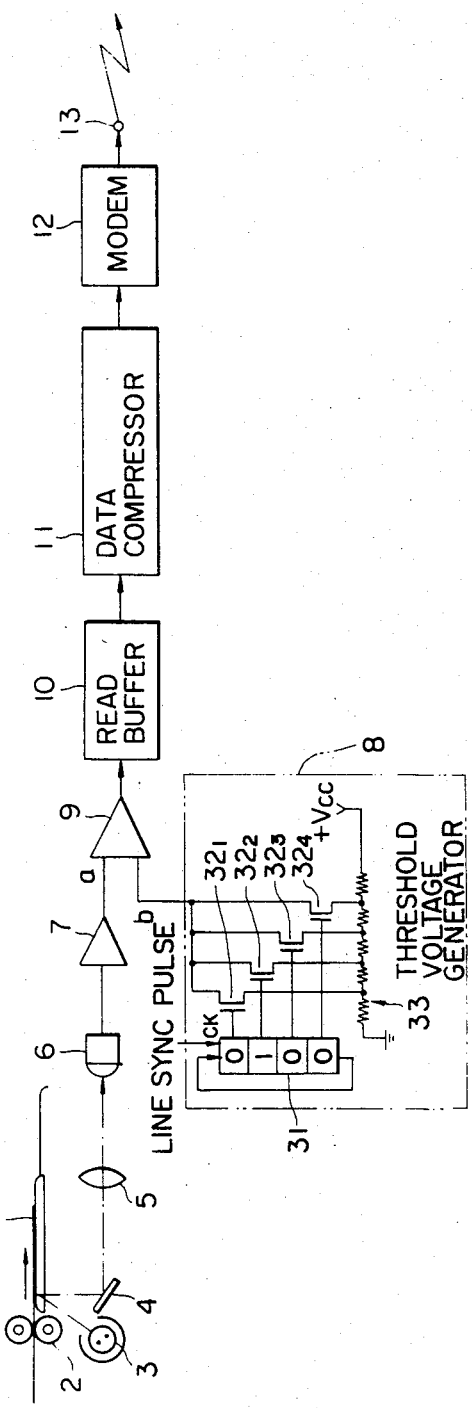
FIG. 1 is a schematic illustration showing the structure of the transmitter in accordance with one embodiment of the present invention.

Referring now to FIG. 1, which schematically shows in blocks and logic symbols the structure of the transmitter in accordance with one embodiment of the present invention, an original 1 containing image information to be transmitted is transported by a feed roller 2 in the direction indicated by the arrow. A light source 3 is provided to illuminate the original 1 and the reflected light therefrom is directed by a mirror 4 to impinge upon an image sensor 6 through a lens 5. The sensor 6 may include a plurality of photoelectric elements arranged in the form of a single array extending in the side-to-side direction of the original 1, which defines the main scanning direction. The auxiliary scanning direction is defined as the direction perpendicular to the main scanning direction and therefore it extends in the leading edge-to-trailing edge direction. Thus, the sensor converts optical image information into electrical image signals.

The converted image signal is an analog signal and it is supplied to one input a of a comparator 9 after having been amplified by an amplifier 7. The other input b to the comparator 9 is connected from the output of a threshold voltage generator 8 which can provide a multilevel threshold. Thus, the level of the analog image signal supplied to the input a is compared with the threshold level at the input b established by the threshold voltage generator 8, and its resulting binary digital signal is obtained at the output of the comparator 9. For example, if the analog signal level is larger than the threshold level, the binary "1" or Hi, indicating a black area, will be supplied as an output. Conversely, if the analog signal level does not exceed the threshold level, the binary "0", or Lo, indicating a white area, will be supplied as an output.

The digital image signal thus produced is supplied to a data compressor 11 through a read buffer 10. The data compressor 11 is provided to eliminate redundancy in the transmitting information so as to increase the data transmission rate. Any conventional data compression technique may be applied to the data compressor 11; however, one commonly used method is to convert a run length, which is the length of continuous "white" or "black" picture elements, into one of the Modified Huffmann codes in such a manner that those run lengths having higher frequencies of appearance have shorter codes; whereas, those run lengths having lower frequencies of appearance have longer codes.

The thus compressed digital signal is supplied to a MODEM (Modulator/Demodulator) 12 to be converted into audio signals suitable for transmission over a telephone line through a telephone line network terminal 13. Of course, MODEM 12 may be omitted if use is made of an exclusive transmission line.

As shown in FIG. 1, the threshold voltage generator 8 includes a 4-bit shiftregister 31 in which only one bit contains the binary "1" and the remaining bits each contain the binary "0." The shiftregister 31 has four outputs each of which is connected to the gate of the corresponding MOS switch $32_1$, $32_2$, $32_3$ or $32_4$ which, in turn, is connected between the input b of the comperator 9 and the corresponding node of a resistor ladder 33 connected between supply voltage $+V_{CC}$ and ground to form a voltage divider.

As shown, a line synchronizing pulse is supplied to the shiftregister 31 in the form of a ring counter. Thus, the threshold level applied to the input b of the comparator 9 varies cyclically with four different values. Explaining more in detail, if the binary "1" is at the topmost bit, the MOS switch $32_1$ is on and therefore the lowest threshold level is applied to the input b. Upon completion of the single scanning line in the main scanning direction, the line synchronizing pulse is supplied to the shiftregister 31 and the binary "1" moves down to the next bit as shown in FIG. 1 to turn only the MOS switch $32_2$ thereby establishing the second lowest threshold level at the input b. In this manner, the threshold level at the input b is increased in a stepwise fashion for every four consecutive scanning lines. It should be noted that since the threshold (reference) level is varied for each scanning line in accordance with this embodiment, the number of transitions from "black" to "white" or its reverse in each scanning line is not unacceptably increased.

As mentioned previously, the compressor 11 codifies the run length of "white" or "black" picture elements. Thus, the more the number of transitions between "black" and "white", the less the effectiveness of the data compression. In the extreme case where "black" and "white" appear alternately from one picture element after another, if the standard compression method (Modified Huffman Coding Method) were applied, the number of bits after compression would be more than three times larger than that of the case without compression since the code length for the run length 1 is comprised of 3 bits. In such a case, the data compressor rather increases the number of bits. For this reason, when the conversion to mesh points, or dither processing, is carried out at the transmitter side, the data without compression may be transmitted faster than the compressed data.

On the other hand, in accordance with the preferred embodiment of the present invention, tone differences in an original image are represented between scanning lines instead of points. In other words, in the disclosed embodiment, the dither processing is not carried out during scanning along a particular scanning line in the main scanning direction. However, the dither processing is carried out for the scanning lines by changing the threshold level as a reference in conversion to binary image data from one scanning line after another. As a result, data compression may be applied advantageously, thereby allowing to compress data with a ratio ranging from 1/5 to 1/50.

If the data thus processed is supplied to a recording device at the receiver side, there will be obtained a reproduced image which is streaky in the horizontal direction. Thus, the reproduced image would be inferior in quality as compared with a mesh point image which is constructed by carrying out the dither processing for each picture element.

Figure 2A:
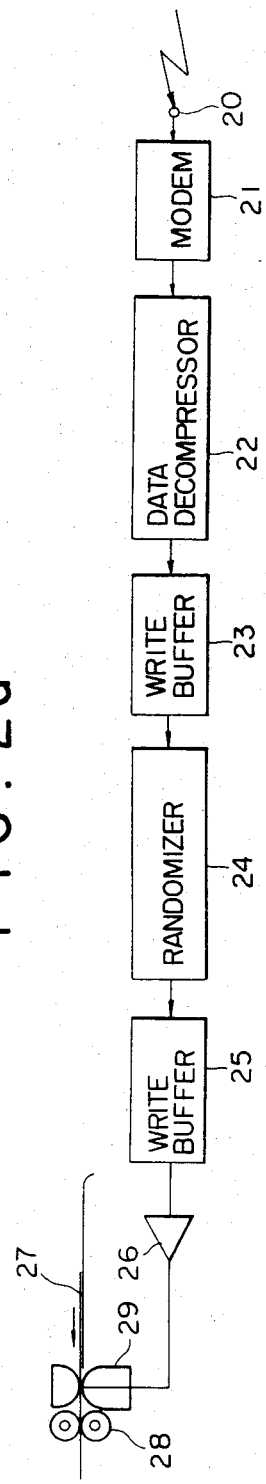
FIG. 2a is a schematic illustration showing the structure of the receiver in accordance with one embodiment of the present invention.

In view of the above-described fact, in accordance with the present invention, a mesh point arrangement is constructed with a picture element as a unit at the receiver side. As shown in FIG. 2a, which illustrates the structure of the receiver in accordance with one embodiment of the present invention, the data in the form of an audio signal is transmitted over a telephone line and received at the telephone line terminal 20 which constitutes an input to the receiver. The thus received audio signal is supplied to a MODEM 21 through which the audio signal is demodulated to the binary image signal expressed in the form of codes. Such a compressed binary image signal is supplied to a data decompressor 22 which then supplies the binary image signal before compression as its output to a write buffer 23.

It is to be noted that the write buffer 23 is capable of storing data for a plurality of full scanning lengths, e.g., four scanning lengths in the case of the embodiment herein disclosed. The information in the write buffer 23 is supplied to a randomizer 24 where picture element information is exchanged between scanning lines and the exchanged information is now stored in another write buffer 25. The output from the write buffer 25 is supplied to a recording head 29 through a recording head driver 26 so that a reproduced image is formed on the surface of a recording medium 27 which is being moved in the direction indicated by the arrow by means of a feed roller 28.

Figure 2B:
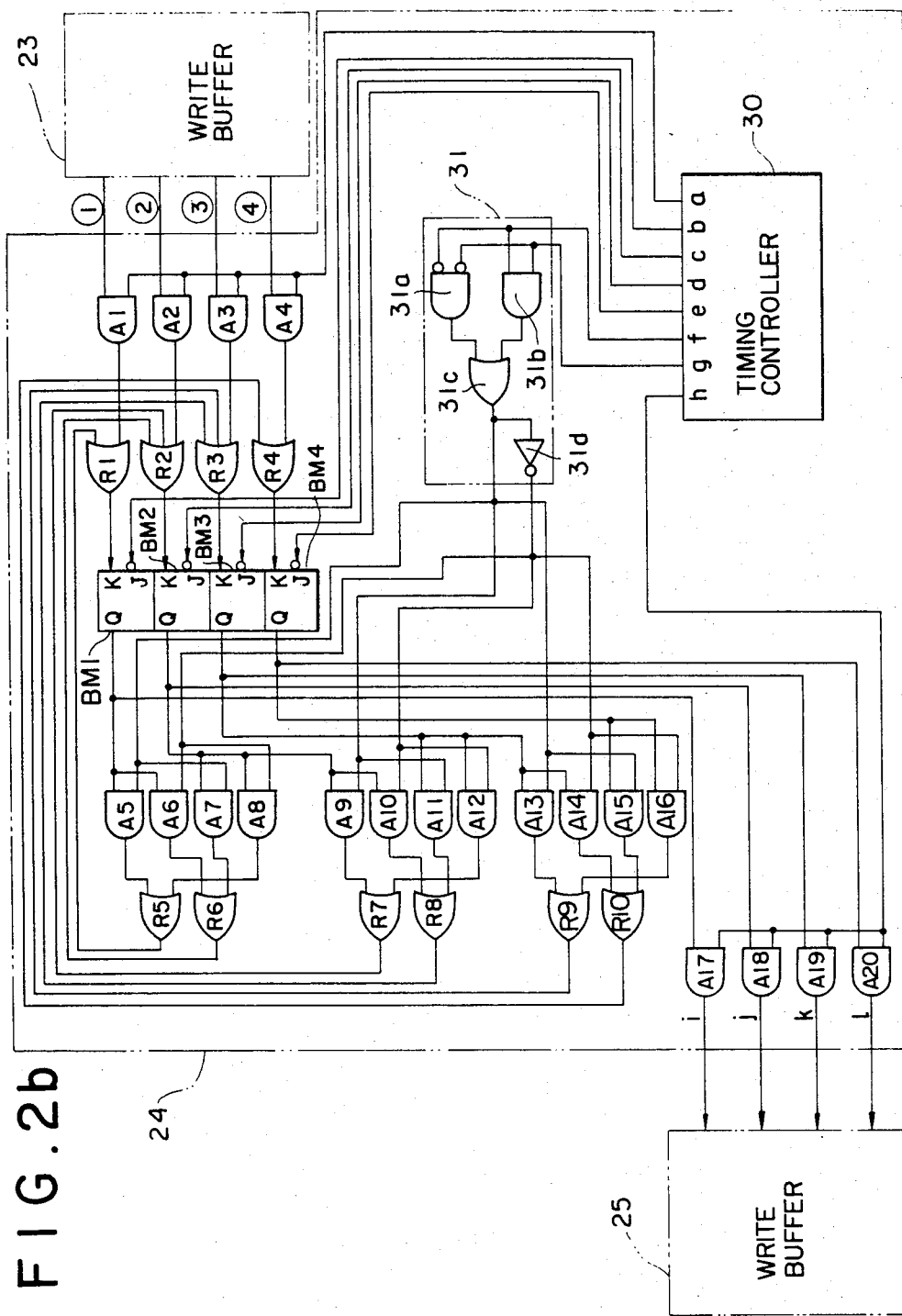

FIG. 2b shows the structure of one example of the randomizer 24 employed in the embodiment of the present invention. As shown, the randomizer 24 includes several AND A1 through A20 and OR R1 through R10 gates, flipflops BM1 through BM4, ½-probability signal generator 31 and a timing controller 30. Explained in detail, the input AND gates A1 through A4 have one of their inputs connected from a corresponding one of four outputs of the write buffer 23. The remaining input of each of these AND gates A1 through A4 is connected from terminal a of the timing controller 30 and their outputs are connected to respective inputs of OR gates R1 through R4.

Each output of OR gates R1 through R4 is connected to K terminal of the corresponding one of four J-K flipflops BM1 through BM4 which at the same time constitute a four-bit memory. The other J terminals of these flipflops BM1 through BM4 are connected from terminals b through e of the timing controller 30, respectively.

The Q output of flipflop BM1 is connected to one input of AND gates A5 and A6 and of output AND gate A17. The Q output of flipflop BM2 is connected to one input of AND gates A7 through A10 and of output AND gate A18. Similarly, the Q output of flipflop BM3 is connected to one input of AND gates A11 through A14 and of output AND gate A19; moreover, the Q output of flipflop BM4 is connected to one input of AND gates A15 and A16 and of output AND gate A20. The OR gate R5 has one input connected from the output of AND gate A5 and the other input connected from the output of AND gate A8, and it has its output connected to the remaining input of OR gate R1. The outputs of AND gates A6 and A7 are connected to the respective inputs of OR gate R6 the output of which is connected to a second input of OR gate R2. The OR gate R7 is provided with its one input connected from the output of AND gate A9 and its the other input connected from the output of AND gate A12, and the output of OR gate R7 is connected to the remaining third input of OR gate R2. The outputs of AND gates A10 and A11 are connected to the respective inputs of OR gate R8 the output of which is connected to a second input of OR gate R3. The OR gate R9 has two inputs each connected from the corresponding output of AND gate A13 or A16 and has its output connected to the remaining third input of OR gate R3. The outputs of AND gates A14 and A15 are connected to the corresponding inputs of OR gate R10 the output of which is connected to the remaining output of OR gate R4.

Furthermore, the ½-probability signal generator 31 has two inputs connected from respective input terminals f and g of the timing controller 30. One output of signal generator 31 is connected to the remaining input of each of AND gates A5, A7, A9, A11, A13 and A15; whereas, the other output, which carries an inverted signal of the signal carried by the former one output, is connected to the remaining input of each of AND gates A6, A8, A10, A12, A14 and A16. Besides, the remaining terminal h of timing controller 30 is connected to the remaining input of each of the output AND gates A17 through A20, the outputs of which are connected in parallel to the write buffer 25, thereby allowing to supply four-bit data, i.e., one for each scanning line.

In operation, in response to the pulse signals supplied from terminals a and b through e, four binary image data ①  through ④, which are positioned in the same address in four separate and parallel scanning lines and each of which represents the image information of a single picture element, are latched into the respective flipflops BM1 through BM4 via AND gates A1 through A4 and OR gates R1 through R4. Then, the current contents ① and ② of flipflops BM1 and BM2 are exchanged with the probability of ½ by the cooperation among AND gates A5 through A8, OR gates R5 and R6, and ½-probability signal generator 31. Then, the current contents ② and ③ of flipflops BM2 and BM3 are exchanged with the probability of ½ by the cooperation among AND gates A9 through A12, OR gates R7 and R8, and ½-probability signal generator 31. Then, the current contents ③ and ④ of flipflops BM3 and BM4 are exchanged with the probability of ½ by the cooperation among AND gates A13 through A16, OR gates R9 and R10, and ½-probability signal generator 31.

Under the above-described circumstances, the picture element information ① in flipflop BM1 is shifted to one of flipflops BM2 through BM4 with the probabilities of ½, ¼ and ⅛, respectively. Similarly, the picture element information ② flipflop BM2 is shifted to one of flipflops BM1, BM3 and BM4 with the probabilities of ½, ¼ and ⅛, respectively. The picture element information ③ in flipflop BM3, on the other hand, is shifted to either one of flipflops BM2 and BM4 with the probabilities of ½ and ¼, respectively. And, the picture element information ④ in flipflop BM4 is shifted to flipflop BM3 with the probability of ½.

Next, the current contents ③' of BM3 and the current contents ④' of BM4 are exchanged with the probability of ½ by cooperation among AND gates A13 through A16, OR gates R9 and R10, and ½-probability signal generator 31. In like manner, the current contents ②' of BM2 and the current contents ③' of BM3 are exchanged with the probability of ½, and, finally, the current contents ①' of BM1 and the current contents ②40 of BM2 are exchanged with the probability of ½.

Upon completion of the above-described exchanging sequence, a strobe signal is supplied from terminal h of the timing controller 30 to one input of each of the output AND gates A17 through A20 so that the current contents in flipflops BM1 through BM4 appear as outputs i through l of the randomizer 24 which are then supplied to the write buffer 25.

As previously described, upon completion of the first half part of the exchanging operation, each of the flipflops BM1 through BM4 has the following probability of storing the input picture element information ① through ④.

BM1: $①' = \frac{1}{2}① + \frac{1}{2}②$

BM2: $②' = \frac{1}{4}① + \frac{1}{2}② + \frac{1}{4}③$

BM3: $③' = \frac{1}{8}① + \frac{1}{8}② + \frac{1}{2}③ + \frac{1}{4}④$

BM4: $④' = \frac{1}{8}① + \frac{1}{8}② + \frac{1}{4}③ + \frac{1}{2}④$

On the other hand, upon completion of the last half part of the exchanging operation, each of the outputs i through l of the randomizer 24 has the following probability of having one of the input information through ① through ④.

$i = 1/8\ ④' + 1/8\ ③' + 1/4\ ②' + 1/2\ ①'$ $= 11/32\ ① + 11/32\ ② + 3/16\ ③ + 1/8\ ④$ $j = i$ $k = 1/4\ ④' + 1/4\ ③' + 1/2\ ②'$ $= 3/16\ ① + 3/16\ ② + 3/8\ ③ + 1/4\ ④$ $l = 1/2\ ④' + 1/2\ ③'$ $= 1/8\ ① + 1/8\ ② + 1/4\ ③ + 1/2\ ④$

As described above, the picture element information ① through ④ are exchanged in position with respect to the auxiliary scanning direction and such exchanging operation is carried out on the basis of the pulse signals supplied from the terminals a through h of the timing controller 30, which pulse signals are shown in FIG. 2c. The pulse signal a is a gate-on signal which functions to supply the picture element information ① through ④ temporarily stored in the write buffer 23 to the OR gates R1 through R4, respectively, and it also has a function as an image synchronizing pulse. The pulses b through e are timing pulses for the data exchanging operation, and all of these pulses become "1" at the same time when the picture element data ① through ④ are to be stored into the flipflops BM1 through BM4, respectively. Thereafter, the memory exchange driving pulses b through e are appropriately applied to the flipflops BM1 through BM4, respectively, so that data exchange is carried out in sequence between BM1 and BM2, BM2 and BM3, BM3 and BM4, BM4 and BM3, BM3 and BM2, and BM2 and BM1. It should be noted that when both of the pulses b and c are "1", the output from OR gate R5 is supplied to flipflop BM1 and at the same time the output from OR gate R6 is supplied to flipflop BM2. The similar relationship holds between pulses d and e and flipflops BM3 and BM4.

The pulses f and g are supplied to the ½-probability signal generator 31. These pulses are of the same frequency and of the same duty cycle, 50%; however, they are out of phase by 90°. As a result, the probability that both of the pulses f and g are at the same level is 50%, which also holds true for the probability of the pulses f and g being at different levels. When both of the pulses f and g are at the same level, "1" is supplied to AND gates A5 and A7 (also to AND gates A9, A11, A13 and A15) and "0" is supplied to AND gates A7 and A9 (also to AND gates A11, A13, A15 and A17) from the ½-Probability signal generator 31.

As is obvious, the data stored in flipflop BM1 is supplied to AND gates A5 and A6 and at the same time the data stored in flipflop BM2 is supplied to AND gates A7 and A8. Further, the outputs from AND gates A5 and A8 are supplied to OR gate R5, the output of which is supplied to flipflop BM1 through OR gate R1; on the other hand, the outputs from AND gates A6 and A7 are supplied to OR gate R6, the output of which is supplied to flipflop BM2 through OR gate R2. Under the circumstances, if the pulses f and g are both at the same level, the data from BM1 is returned to BM1 and the data from BM2 is also returned to BM2, thereby no exchanging of data takes place; whereas, if the pulses f and g are at different levels, the data from BM1 is supplied to BM2 and the data from BM2 is supplied to BM1, thereby exchanging of data takes place. The similar arguments hold true for the exchanging of data between BM2 and BM3 as well as between BM3 and BM4.

According to the above-described operation, picture element data are randomly exchanged in the auxiliary scanning direction, or between different scanning lines, as best shown in the bottom portion of FIG. 2c. Therefore, the write buffer 25 receives a binary image signal which is extended to a point-dependent dither-processed signal from a line-dependent dither-processed signal. Such a mesh-point converted binary image signal is then applied to the recording head 29.

Further embodiments and modifications of the present invention will now be described.

In the embodiment described above, use is made of a combination of logic elements in forming randomizer 24. Instead, use may be made of a computer or a microprocessor such as LSI. For example, use may be made of a read only memory which stores the information as to the order and/or manner of exchanging, or rearranging, picture element data in a predetermined fashion, random or regular, and then the picture element data, one from each of a predetermined number of scanning lines in the same address, are read out from the write buffer 23 and their positions are exchanged in accordance with the exchanging information from the read only memory. And the thus exchanged data may be returned to the write buffer 23 for recording. The above process may be repeated for each of the subsequent addresses. In this case, either one of the buffers 23 and 25 may be eliminated.

Alternative form of the signal generator 31 is a combination of a noise generator and a noise signal-to-binary signal converter. In this case, a binary-converted noise signal and its inverted signal are applied to the two inputs of each of AND gates A5 through A16. It should also be noted that the pulse signals f and g may have different frequencies from each other.

Further, in the embodiment described above, the exchanging of picture element data between different scanning lines takes place in a random fashion; however, the present invention should not be limited to this, and a cyclic or regular exchanging operation is equally applicable. It is, however, also true that, in order to avoid streaky appearances on a reproduced copy as much as possible, it had better carry out randomly at least either of the variation of the threshold voltage at the transmitter side and the exchanging of picture element data at the receiver side. Moreover, in converting an analog image signal into a binary image signal, the well-known threshold voltage setting method may be applied, according to which a threshold voltage is automatically determined in dependence of the number or area of "black" picture elements for a predetermined scanning distance or area.

In the embodiment described above, four consecutive scanning lines form a set and the threshold voltage is changed from one scanning line after another with exchanging picture element data between scanning lines in the same set. However, two or more scanning lines other than four may be selected to form such set. And the variation of threshold voltage may be carried out for every two or more scanning lines. Besides, exchanging of picture element data may be carried out among three or more different scanning lines at the same time instead of two scanning lines as in the above-described embodiment.

As described in detail above, in accordance with the present invention, at least one of the threshold voltage and the analog image information level is varied with respect to the other only in the auxiliary scanning direction to carry out image density control for one or more scanning lines as a unit at the transmitter side. And, then, at the receiver side, the picture element data for a predetermined number of scanning lines are pooled to form a set and the picture element data are exchanged between different scanning lines in the auxiliary scanning direction.

When the threshold voltage is maintained at constant during scanning along the main scanning direction as in one embodiment of the present invention, the rate of compression is virtually the same as that without dither processing. Thus, even in the case where the length of one scanning line for an A4-sized original includes 1,728 picture elements, the present invention may be applied to a part of the scanning line or divided scanning line sections, e.g., ½, ⅓, ¼, etc. of the full scanning line. However, such an individual scanning line section must be sufficiently long as compared with the mesh point pitch in dither processing. In other words, the length of the scanning line in the present invention must be substantially larger than the maximum pitch in the threshold level variation along the main scanning direction in the prior art dither processing, and it can be as large as the maximum length which can be transmitted and received in the system in question which is usually determined by the physical length of the image sensor array.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A digital facsimile communication system capable of representing tone differences comprising a transmitter, a receiver and a transmission line for connecting said transmitter with said receiver, said transmitter comprising:

analog-to-digital data converting means for converting analog image data obtained by photoelectrically scanning an original into binary image data with the use of a multilevel threshold, the level of which is varied for every predetermined number of said binary image data thereby forming groups of binary image data; and data compressing means for compressing said binary image data in order to eliminate redundancy of information; and said receiver comprising:

data decompressing means for decompressing said compressed binary image data transmitted over said transmission line; and exchanging means for exchanging the binary image data between at least two of said groups of binary image data thereby forming an output signal.

2. The system as in claim 1 wherein said transmission line is a telephone line and either of said transmitter and receiver further comprises MODEM means for carring out conversion between said binary image data and audio signals suitable for transmission over said telephone line.

3. The system as in claim 1 wherein said analog-to-digital data converting means includes a threshold voltage generator which produces a multilevel threshold, the level of which is maintained at constant for the entire scanning line in the main scanning direction.

4. The system as in claim 3 wherein said threshold voltage generator produces different threshold levels in a cyclic manner.

5. The system as in claim 1 wherein said exchanging means includes a buffer for temporarily storing a predetermined number of said groups of binary image data supplied from said data decompressing means and an exchanger for exchanging the binary image data in the same address among said predetermined number of groups.

6. The system as in claim 5 wherein said exchanger exchanges the binary image data randomly.

7. The system as in claim 5 wherein said exchanger exchanges the binary image data in a cyclic manner.

8. The system as in claim 5 wherein said exchanger includes a computer for controlling the manner of exchanging the binary image data.

* * * * *